(12) United States Patent
Rings

(10) Patent No.: US 11,200,475 B2
(45) Date of Patent: *Dec. 14, 2021

(54) TRANSACTION TOKEN THAT EXHIBITS INDICATION-RELATED DETECTABLE CHANGES ON THE TRANSACTION TOKEN

(71) Applicant: Capital One Services, LLC, McLean, VA (US)

(72) Inventor: Joerg Rings, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/112,536

(22) Filed: Dec. 4, 2020

(65) Prior Publication Data

US 2021/0089856 A1 Mar. 25, 2021

Related U.S. Application Data

(63) Continuation of application No. 16/785,927, filed on Feb. 10, 2020, now Pat. No. 10,860,911, which is a continuation of application No. 16/536,536, filed on Aug. 9, 2019, now Pat. No. 10,635,961.

(51) Int. Cl.
*G06K 19/07* (2006.01)
*G06Q 20/34* (2012.01)
*G06K 19/077* (2006.01)

(52) U.S. Cl.
CPC ..... *G06K 19/0723* (2013.01); *G06K 19/0772* (2013.01); *G06Q 20/352* (2013.01)

(58) Field of Classification Search
CPC ..................... G06K 19/0723; G06K 19/0772
USPC ........................................................ 235/492
See application file for complete search history.

(56) References Cited

U.S. PATENT DOCUMENTS 10,860,911 B1 * 12/2020 Rings ............... G06K 19/07705

* cited by examiner

*Primary Examiner* — Daniel A Hess
(74) *Attorney, Agent, or Firm* — Perkins Coie LLP

(57) ABSTRACT

In certain embodiments, indication-related detectable changes on a transaction token may be facilitated. In some embodiments, a transaction card may determine a state of the transaction card (e.g., during an interaction with a transaction terminal). The transaction card may generate a signal related to a color based on the state of the transaction card and cause the signal to be transmitted to a change element of the transaction card. The change element may be configured such that the change element causes one or more edges or other portions of the transaction card to be (i) a first color in response to the signal being a first signal and (ii) a second color in response to the signal being a second signal. As an example, the portions of the transaction card may turn red when the signal is a first voltage and green when the signal is a second voltage.

20 Claims, 4 Drawing Sheets

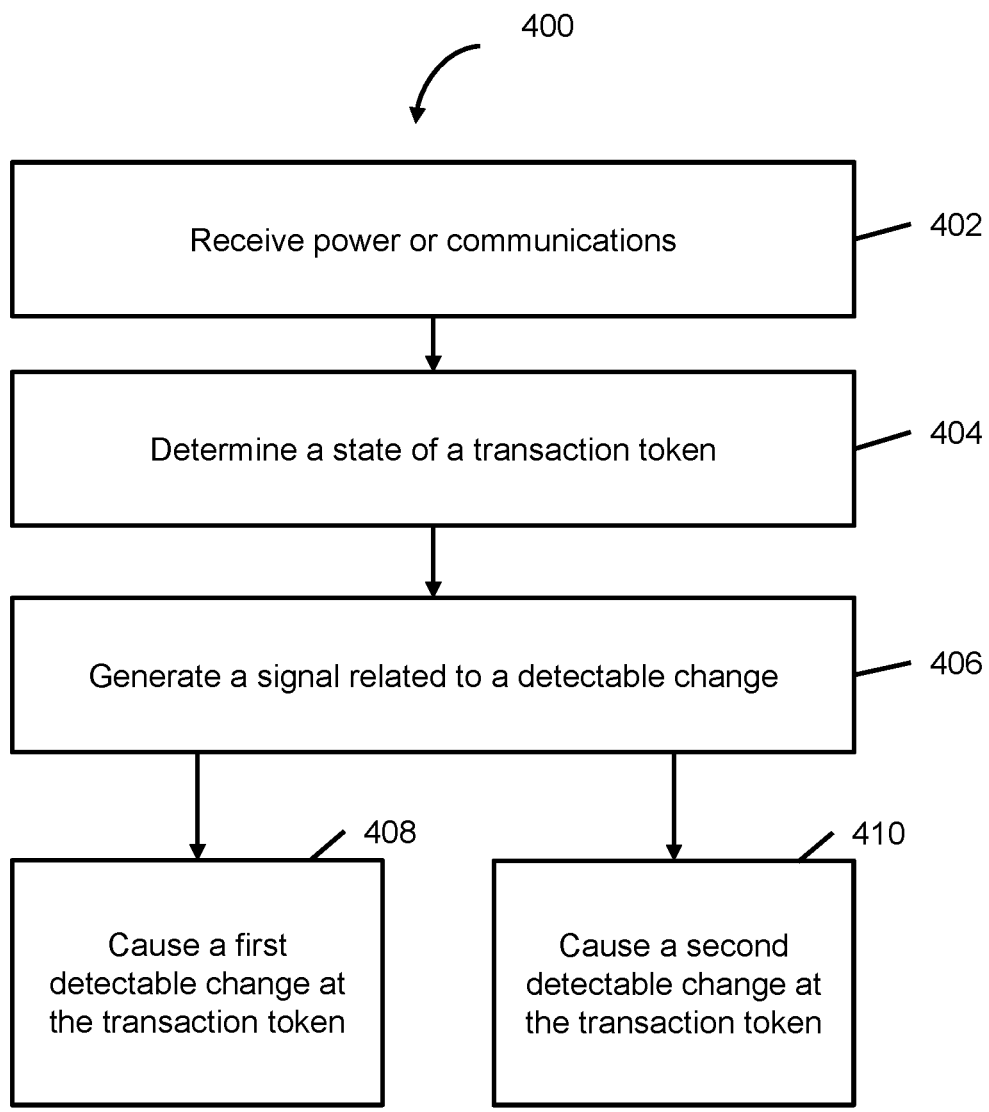

TRANSACTION TOKEN THAT EXHIBITS INDICATION-RELATED DETECTABLE CHANGES ON THE TRANSACTION TOKEN

CROSS-REFERENCE TO RELATED APPLICATION(S)

This application is a continuation of U.S. patent application Ser. No. 16/785,927, filed Feb. 10, 2020, which is a continuation of U.S. patent application Ser. No. 16/536,536, filed Aug. 9, 2019. The content of the foregoing applications is incorporated herein in its entirety by reference.

FIELD OF THE INVENTION

The invention relates to a transaction token, including, for example, a transaction card configured to indicate a transaction status during a transaction session, a transaction card configured to facilitate indication-related detectable changes (e.g., color change), etc.

BACKGROUND OF THE INVENTION

Advances in transaction card technology have made transactions less burdensome for users when making transactions with transaction cards at ATMs, payment card readers, transit gates, and other terminals. Despite such advancements, terminals are inconsistent in providing users with prompts and updates related to the status of a transaction. As an example, with respect to payment terminals, a user may sometimes be unaware that a payment transaction is still progressing and remove their card prematurely from the card reader. Thus, in such cases, a user may need to restart the transaction or reinsert their card, wasting time and resources and causing much frustration. These and other drawbacks exist.

SUMMARY OF THE INVENTION

Aspects of the invention relate to systems and methods for facilitating a transaction status indication or other indication on a transaction card by causing one or more portions of the transaction card to be a specific illumination or color when the transaction card is in a specific state.

In some embodiments, a transaction card may include circuitry, a change element, or other components. In some embodiments, the circuitry of the transaction card may determine a state of the transaction card (e.g., while the transaction card is powered by a terminal processing a transaction associated with the transaction card). The circuitry may generate a signal related to a color based on the state of the transaction card and cause the signal to be transmitted to the change element. In some embodiments, the change element may be configured such that the change element causes one or more edges or other portions of the transaction card to be (i) a first color in response to the signal being a first signal and (ii) a second color in response to the signal being a second signal. As an example, the portions of the transaction card may turn red when the signal is a first voltage, and the portions of the transaction card may turn green when the signal is a second voltage different from the first voltage.

Various other aspects, features, and advantages of the inventions will be apparent through the detailed description of the invention and the drawings attached hereto. It is also to be understood that both the foregoing general description and the following detailed description are exemplary and not restrictive of the scope of the inventions. As used in the specification and in the claims, the singular forms of "a", "an", and "the" include plural referents unless the context clearly dictates otherwise. In addition, as used in the specification and the claims, the term "or" means "and/or" unless the context clearly dictates otherwise.

BRIEF DESCRIPTION OF DRAWINGS

FIG. 4 shows a flowchart of a method of facilitating indication-related detectable changes at a transaction token, in accordance with one or more embodiments.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
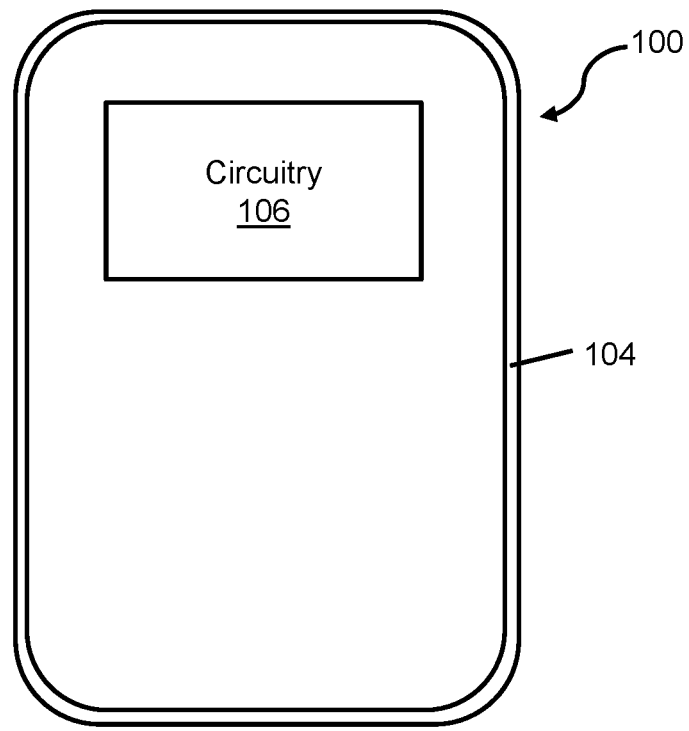
FIGS. 1A and 1B show transaction tokens configured to facilitate indication-related detectable changes, in accordance with one or more embodiments.
Figure 1B:
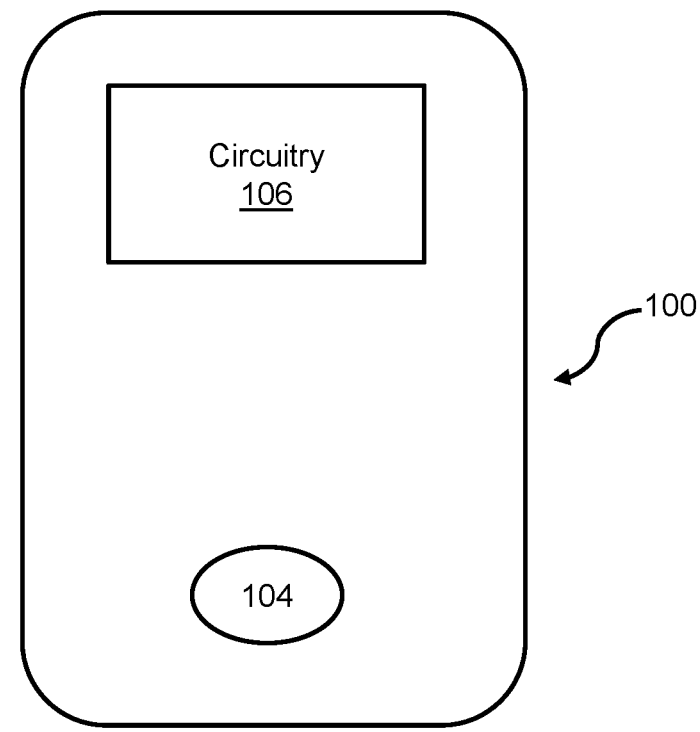

FIGS. 1A and 1B show examples of a transaction token 100. In some embodiments, the transaction token 100 may be configured to use a signal related to an illumination or color to cause one or more edges or other portions of the transaction token 100 to exhibit the illumination or color. As an example, the portions of the transaction token 100 may exhibit (i) a first illumination or color in response to the signal being a first signal (e.g., a first voltage or other signal), (ii) a second illumination or color in response to the signal being a second signal (e.g., a second voltage or other signal), (iii) a third illumination or color in response to the signal being a third signal (e.g., a third voltage or other signal), or (iv) other illumination or color in response to the signal being some other signal.

In some embodiments, the transaction token 100 may generate the signal (which causes the portions of the transaction token 100 to exhibit the illumination or color) based on a state associated with the transaction token 100. As an example, the associated state may include a state of the transaction token 100 (e.g., being read, not being read, receiving communication, not receiving communication, or other token state), a status of a transaction associated with the transaction token 100 (e.g., transaction error, transaction in progress, transaction complete, or other transaction status), or other state associated with the transaction token 100. In this way, for example, the illumination or color (or other detectable change) on the transaction token 100 itself (e.g., transaction card) may help provide a more intuitive indication to a user. As an example, one or more portions of a credit, debit, or other payment card may exhibit a red color when the payment card is being processed and should not be removed. However, when the payment card is no longer being processed and should be removed, the portions of the payment card may exhibit a green color (as opposed to the red color).

Figure 2A:
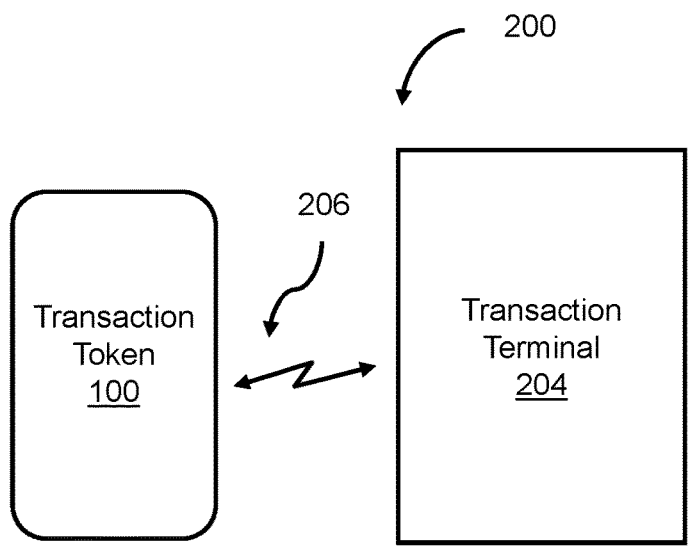
FIGS. 2A and 2B show a system that includes a transaction token and a transaction terminal configured to facilitate indication-related detectable changes, in accordance with one or more embodiments.
Figure 2B:
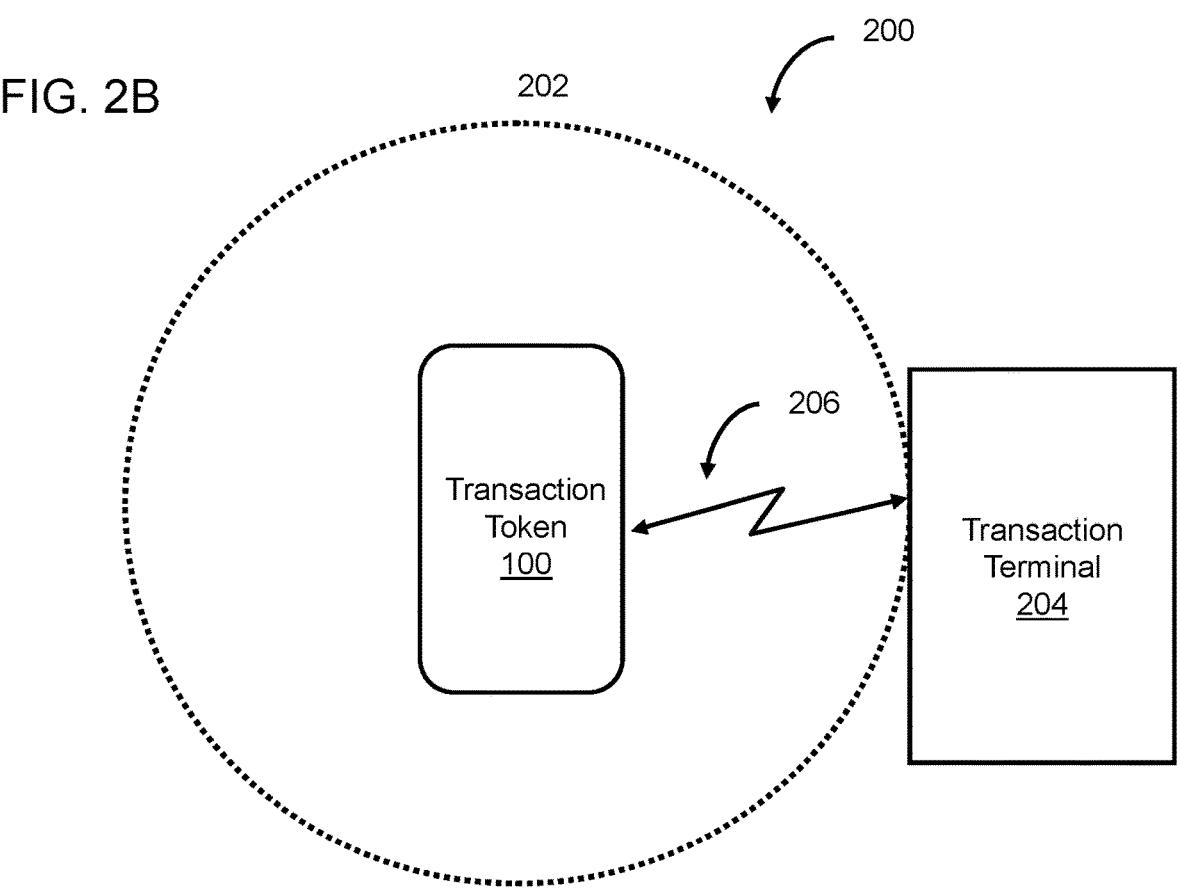

In some embodiments, each transaction token 100 may be configured to indicate the status of a transaction associated with a transaction token 100 at a terminal (e.g., terminal 204 illustrated in FIGS. 2A and 2B). The transaction token 100 may be any token configured to provide payment information or other transaction-related information to a terminal. In some embodiments, the transaction token 100 may be a transaction card, such as a credit card, a debit card, a payment card, a wallet card, a smart card, a transit pass, or other transaction card. In some embodiments, the transaction token 100 may be a tag, a mobile phone, a wearable device, or other device.

The transaction token 100 may have a given length, width, and thickness. In some embodiments, the transaction token 100 may have a length of 80-87 millimeters, a width of 50-57 millimeters, and a thickness of 0.6-0.8 millimeters. In some embodiments, the transaction token 100 may have a maximum thickness of 1 millimeter. As an example, the transaction token 100 may have dimensions that are typical of credit, debit, or other payment cards.

As shown in FIGS. 1A and 1B, a transaction token 100 may include a change element 104, circuitry 106, or other components. In some embodiments, the change element, the circuitry 106, or other components of the transaction token 100 may be embedded in the transaction token 100. It should be noted that, while one or more operations are described herein as being performed by particular components of the transaction token 100, those operations may, in some embodiments, be performed by other components of the transaction token 100, components of a transaction terminal (e.g., terminal 204 illustrated in FIGS. 2A and 2B), or other components. As an example, while one or more operations are described herein as being performed by the circuitry 106, those operations may, in some embodiments, be performed by components of a transaction terminal (e.g., terminal 204 illustrated in FIGS. 2A and 2B). It should be noted that, although some embodiments are described herein with respect to illumination or color change, other detectable change to one or more portions of the transaction token 100 (e.g., change in texture, size, shape, etc.) may be implemented in lieu of or in addition to illumination or color change.

In some embodiments, the circuitry 106 of the transaction token 100 may be configured to determine a state of the transaction token 100. As an example, the circuitry 106 may determine whether or not the transaction token 100 is being read by the transaction terminal 204. In some embodiments, the state of the transaction token 100 may correspond to the status of a transaction associated with the transaction token 100. For example, when the state of the transaction token 100 is that the transaction token 100 is being read (e.g., currently being read or has not been read within a predetermined threshold amount of time), the status of the transaction may be "in progress." When the state of the transaction token 100 is that the transaction token 100 is not being read (e.g., has not been read for at least the predetermined threshold amount of time), the status of the transaction may be "complete."

By way of example, the circuitry 106 may include a signal generator, a processor, a memory, a receiver, a transmitter, or other electrical components. In some embodiments, the change element 104 may be embedded in the transaction token 100 or located on the transaction token 100. In some embodiments, one or more edges (FIG. 1A), designs (FIG. 1B), or other portions of the transaction token 100 may include one or more change elements 104. For example, FIG. 1A illustrates that one or more change elements 104 is located at one or more edges of the transaction token 100. In another example, FIG. 1B illustrates that at least part of the change element 104 forms a shape design on the transaction token 100. While FIG. 1B illustrates that at least part of the change element 104 forms a particular shape, it is to be understood that it may be any shape or design. As a further example, the edges may border the transaction token 100 or a feature located on the transaction token 100. As a further example, the designs may be any logo or pattern.

In some embodiments, the circuitry 106 of the transaction token 100 may determine a state of a transaction associated with a transaction token 100 based on interactions between the transaction token 100 and a terminal processing a transaction associated with the transaction token 100. For example, such interactions may include the transaction token 100 receiving power or communications from the transaction terminal 204. In some embodiments, the circuitry 106 of the transaction token 100 may interface with the communication port of the terminal to engage in interactions between the transaction token 100 and a terminal. In some embodiments, communications may include data transmissions or commands that the transaction token 100 receives from the transaction terminal 204. In one use case, in response to the transaction token 100 receiving a command from the transaction terminal 204 (e.g., a command to send credit card data to the transaction terminal 204), the circuitry 106 may determine that the transaction token is in a first state (e.g., a state of being read). In response to the transaction token 100 receiving a confirmation of payment from the transaction terminal 204, the circuitry 106 may determine that the transaction token 100 is in a second state (e.g., a state of no longer being read by the transaction terminal 204).

In some embodiments, the circuitry 106 may be configured to generate a signal based on the state of the transaction token 100 and cause the signal to be transmitted to the change element 104. In some embodiments, a signal may be an electric potential in volts, and the signal may correspond to a specific illumination or color. As an example, the circuitry 106 may generate a first signal (e.g., a first voltage signal) based on a determination that the state of the transaction token 100 is a first state, and the circuitry 106 may generate a second signal (e.g., a second voltage signal different from the first voltage signal) based on a determination that the state of the transaction token is a second state. In one use case, if the transaction token is being read by the transaction terminal 204, the circuitry 106 may generate a first voltage (e.g., X volts) corresponding to a first illumination or color (e.g., red, indicating that the status of the transaction is in progress and that the transaction token 100 should not be removed from the transaction terminal 204). On the other hand, if the transaction is no longer being read by the transaction terminal 204, the circuitry 106 may generate a second voltage (e.g., Y volts) corresponding to a second illumination or color (e.g., green, indicating that the status of the transaction is complete or that the transaction token 100 may be removed from the transaction terminal 204).

In some embodiments, the change element 104 may be configured to cause one or more portions of the transaction token 100 to change color or illuminate in response to the signal. As an example, the edges of the transaction card may turn red when the signal is a first signal (e.g., a first voltage signal), and the edges of the transaction card may turn green when the signal is a second signal (e.g., a second voltage signal). In some embodiments, other portions (other than or in addition to the edges) of the transaction token 100 may change color or illuminate in response to signals corresponding to a specific color or illumination.

In some embodiments, the change element 104 may include electrochromic material or other chromogenic material, such as a metal oxide, conjugated polymer, transition metal complex, viologen, a metal hexacyanometallate, or other material. In some embodiments, the change element 104 may include electroactive material that exhibits illumination or color changes based on a stimulus provided by the circuitry 106, such as an electrical potential of a specified voltage. In some embodiments, the change element 104 includes electrochromic material deposited on a substrate of the transaction token 100. In some embodiments, the change element 104 may include electrodes, mirrors, conductive films, or electrolyte layers. In some embodiments, the change element 104 may include a light emitting diode (LED) element. In some embodiments, the change element 104 may include other materials or components that produces one or more other detectable changes in one or more portions of the transaction token 100, such as a change in texture, temperature, size, shape, or other detectable change. For example, such materials may include tactile electroactive polymers that exhibit a change in size or shape when stimulated by an electric field.

In some embodiments, after the portions of the transaction token 100 are caused to be an illumination or color based on a signal generated by the circuitry 106 (e.g., a voltage signal being generated based on a state of the transaction token 100), the circuitry 106 may provide the change element 104 with another signal (e.g., another voltage signal different from the previous voltage signal) to reverse the change in illumination or color of the portions to an initial illumination or color different from the current illumination or color. For example, the initial illumination or color may be colorless, white, or neutral, or no illumination.

In some embodiments, the portions of the transaction token 100 that exhibit an illumination, a color, or other detectable change (e.g., based on voltage or other generated signals) may include indicia (e.g., a logo, name, slogan, or other indicia) on the transaction token 100. As an example, the indicia may include identification information associated with owner of the transaction token 100 or institution servicing the transaction token 100.

FIG. 2A shows a transaction system 200 configured to facilitate indication-related detectable changes, in accordance with one or more embodiments. As shown in FIG. 2A, transaction system 200 may include a transaction token 100, transaction terminal 204, or other components. FIG. 2A shows wired operation of the transaction token 100, where the transaction token 100 comes in contact with the transaction terminal 204. FIG. 2B shows wireless operation of the transaction token 100, where the transaction token 100 does not come into direct contact with the transaction terminal 204 and is within a communication range 202 of the transaction terminal 204.

By way of example, the transaction terminal 204 may be any terminal that processes transactions. In some embodiments, the transaction terminal 204 may be an ATM, card readers, transit gates, a toll booth, a device restricting entry, mobile phone, a wearable device, a tablet, a computer, a virtual terminal, a point-of-sale system, a wireless device, or other electronic systems. In some embodiments, transactions associated with transaction token 100 and the transaction terminal 204 may include payments, deposits, access to one or more areas (e.g., a restricted area, public transit, etc.), access to data (e.g., access to a secure virtual environment), or other activities related to transactions.

With respect to FIGS. 2A and 2B, transaction token 100 may engage in interactions 206 with the transaction terminal 204 or other components of transaction system 200. In some embodiments, the various systems illustrated in FIGS. 2A and 2B may include one or more devices that are programmed to perform the functions described herein. The systems may include one or more electronic storages, one or more physical processors programmed with one or more computer program instructions, one or more servers, and/or other components. The systems may include communication lines or ports to enable the exchange of information within a network (e.g., a credit card network) or other computing platforms via wired or wireless techniques (e.g., Ethernet, fiber optics, coaxial cable, WiFi, Bluetooth, near field communication, or other technologies). The systems may include a plurality of hardware, software, and/or firmware components operating together. For example, the transaction terminals 204 may be implemented by a cloud of computing platforms operating together as the terminals.

In some embodiments, the transaction token 100 may engage in interactions 206 with the transaction terminal 204 by being in direct contact with the transaction terminal 204. In some embodiments, the transaction token 100 may engage in interactions 200 with the transaction terminal 204, when the transaction token is within a certain communication range 202 (e.g., up to 5 inches or other communication range).

In some embodiments, the interactions 206 may be unidirectional or bidirectional between the transaction token 100 and the transaction terminal 204. In some embodiments, interactions 206 may include the transaction token 100 being powered by the transaction terminal 204. In some embodiments, the interactions 206 may include the transaction token 100 receiving communications from the transaction terminal 204, such as a data transmission or a command. As an example, a data transmission may be a confirmation of successful payment transmitted from the transaction terminal 204 to the transaction token 100. As a further example, the command may be a protocol parameter selection command transmitted from the transaction terminal 204 to the transaction token 100. In some embodiments, the interactions 206 may include communications transmitted from the transaction token 100 to the transaction terminal, such as a data transmission or a request. As an example, a data transmission may be credit card details transmitted from the transaction token 100 to the transaction terminal 204. As a further example, a request may be a request to make a payment from the transaction token 100 to the transaction terminal 204.

In some embodiments, the transaction token 100 may determine a state of the transaction token 100 from the interactions 206 between the transaction token 100 and the transaction terminal 204. As an example, a first state that the transaction token 100 is being read by the transaction terminal 204 may be determined from the interaction 200 being an activation sequence or a payment request that is transmitted from the transaction terminal 204 to the transaction token 100. As a further example, a second state that the transaction token 100 is not being read by the transaction terminal 204 may be determined from the interaction 200 being a data transmission regarding confirmation of payment transmitted from the transaction terminal 204 to the transaction token 100.

It should be noted that, in some embodiments, the interactions 206 (e.g., power or communications) are not necessary for the transaction token 100 to determine a state of the transaction token 100. As an example, the circuitry 106 may determine the state of the transaction token 100 from a transaction token 100's internal processes. In one use case, the circuitry 106 may detect that a specific internal process of the transaction token 100 is being conducted (e.g., that certain program code from the transaction token 100's memory is running) and determine that the state of the card is being read by the transaction terminal 204.

In some embodiments, the transaction terminal 204 may transmit information related to a signal to the transaction token 100 to cause a detectable change to one or more portions of the transaction token 100. As an example, the transaction terminal 204 may transmit information indicating the signal (e.g., a specific voltage) that is to be generated by the transaction token 100. As an example, upon obtaining the information indicating the voltage, the transaction token 100 may cause the voltage to be provided to electrochromic material on the transaction token 100, thereby causing the electrochromic material to become an illumination or color corresponding to the voltage.

In one scenario, the transaction terminal 204 may determine the illumination or color or the signal corresponding to the illumination or color. In some embodiments, an interaction 206 from the transaction terminal 204 may cause the circuitry 106 of the transaction token 100 to generate a signal associated with a particular illumination or color. As an example, the transaction terminal 204 may send the circuitry 106 a command that the signal should be a first signal associated with a red color (e.g., a first voltage of X volts), a command that the signal should be a second signal associated with a green color (e.g., a second voltage of Y volts), or other command. As another example, the transaction terminal 204 may determine the signal (to be generated by the transaction token 100) based on a state of the transaction token 100 or transaction terminal 204, a status of a transaction associated with the transaction token 100, or other information. Upon such determination, the transaction terminal 204 may transmit a command specifying the signal to the transaction token 100.

In another scenario, the transaction terminal 204 may determine the state of the transaction token 100 and transmit information indicating the state to the transaction token 100, and the transaction token 100 may generate the signal corresponding to the illumination or color based on the indicated state. For example, based on the transaction token 100 requesting the initiation of a payment, the transaction terminal 204 may predict the transaction to be in a first state (e.g., a state of being read) and provide the prediction to the transaction terminal 100. In a further scenario, the transaction terminal 204 may determine the state of the transaction token 100 and then determine the illumination or color or the corresponding signal based on the determined state.

In some embodiments, the transaction system 200 may include a transaction processing server (e.g., a remote server or other server with which the transaction terminal 204 interacts), and the transaction processing server may transmit information indicating a signal to the transaction terminal 204 to cause a detectable change to one or more portions of the transaction token 100. As an example, the transaction processing server may determine the illumination or color to be exhibited at the transaction token 100 or the signal corresponding to the illumination or color, and send a command to the transaction terminal 204 to forward to the transaction token 100 to cause its exhibition of the illumination or color. In one use case, the transaction processing server may generate and send commands via techniques similar to those described in the foregoing scenario with respect to the generation of such commands by the transaction terminal 204. In some embodiments, the transaction token 100 may directly interact with the transaction processing server without the transaction terminal 204 as an intermediary to determine or transmit a signal, with the transaction processing server determining and transmitting the signal to the transaction token 100.

Figure 3:
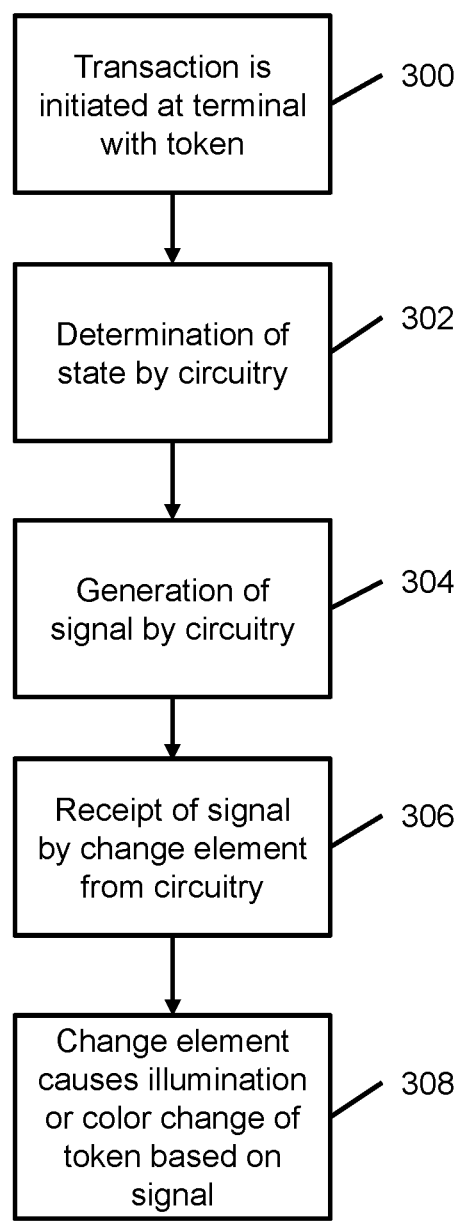
FIG. 3 shows a flowchart of a method of facilitating indication-related illumination or color changes at a transaction token, in accordance with one or more embodiments.

FIG. 3 shows an example flowchart of processing operations of a method 300 that facilitating indication-related illumination or color changes at a transaction token, in accordance with one or more embodiments. The processing operations of the method presented in FIG. 3 is intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, at 300, a transaction is initiated by a user at a transaction terminal 204, and the circuitry 106 of the transaction token 100 associated with a transaction begins to engage in interactions 206 with the transaction terminal. In some embodiments, interactions 206 may include: power received by the transaction token 100 from the transaction terminal 204; a command that the transaction token 100 receives from the transaction terminal 204; or a data transmission that the transaction token 100 receives from the transaction terminal 204.

In some embodiments, at 302, the circuitry 106 determines the state of the transaction token 100 during the transaction. As an example, For example, the state of the transaction token 100 may be: (1) a first state in which the token is being read by the transaction terminal 204; (2) a second state in which the token is not being read by the transaction terminal 204, or (3) other state. In some embodiments, the state of the transaction token 100 may be determined based on the interactions 206 between the transaction token 100 and the transaction terminal 204.

In some embodiments, a specific state may be associated with a specific interaction 206 between the transaction token 100 and the transaction terminal 204 during the transaction. For example, a state that the transaction token 100 is being read by the transaction terminal may be associated with an interaction 206 that is a command from the transaction terminal 204 to provide credit card information. In a further example, a state that the transaction token is being read by the transaction terminal may be associated with an interaction 206 that is an electric charge from the transaction terminal 204. In a further example, if the interaction 206 is a command by the transaction terminal 204 to activate the transaction token 100, the state may be determined to be a first state that is associated with the token being read by the transaction terminal 204. In a further example, if the interaction 206 is a data transmission confirming payment, the state may be determined to be a second state that is the token not being read by the transaction terminal 204. In a further example, if the interaction 206 is a command to terminate payment, the state may be determined to be a second state that is the token not being read by the transaction terminal 204.

In some embodiments, at 304, the circuitry 106 may generate the signal based on the state of the transaction token 100. For example, the signal may be an electrical potential, such as a specified voltage. In some embodiments, based on the state being a first state (e.g., that the transaction token 100 is being read by the transaction terminal 204), the signal may be a first signal (e.g., a first voltage of X volts). In some embodiments, based on the state being a second state (e.g., that the transaction token 100 is not being read by the transaction terminal 204), the signal may be a second signal (e.g., a second voltage of Y volts). In some embodiments, the signal may be a stimulus that causes an illumination or color change by a change element 104. In some embodiments, the signal may be a specific signal associated with a specific color based on a specific state of the token.

In some embodiments, at 306, the change element 104 receives a signal from the circuitry 106. In some embodiments, the signal transmitted to the change element 104 from the circuitry 106 is an electric potential (e.g., a specified voltage). For example, if the change element 104 includes an electrochromic element, the first signal may be an electric potential of a first voltage that corresponds to a red color, and a second signal may be an electric potential of a second voltage that corresponds to a green color. In some embodiments, the signal may be a stimulus that causes one or more other detectable changes in one or more portions of the transaction token 100. In some embodiments, the signal may cause one or more portions of the transaction token 100 to exhibit a detectable change, such as a color, light production, texture, size, shape, or other change detectable by a user of the transaction token 100.

In some embodiments, at 308, based on the signal, at least one or more portions of the transaction token 100 may be caused by the change element 104 to change in color. In some embodiments, the color indicates a status of the transaction to the user of the transaction token 100 at a transaction terminal 204. For example, a red color may indicate that the status of the transaction is in progress, and a green color may indicate that the status of the transaction is complete.

FIG. 4 shows an example flowchart of processing operations of a method 400 that facilitating indication-related detectable changes at a transaction token, in accordance with one or more embodiments. The processing operations of the method presented in FIG. 4 are intended to be illustrative and non-limiting. In some embodiments, the methods may be accomplished with one or more additional operations not described, and/or without one or more of the operations discussed. Additionally, the order in which the processing operations are illustrated (and described below) is not intended to be limiting.

In an operation 402, a transaction token receives power or communications during a transaction. As an example, the transaction may include payments, deposits, access to one or more areas (e.g., a restricted area, public transit, etc.), access to data (e.g., access to a secure virtual environment), or other activities related to transactions. The token may receive a small charge to power the token during the transaction from the terminal. Communications may include data transmissions or commands, such as requests to provide credit card information. In some embodiments, operation 402 may be caused by contact between the token and terminal or with a wireless connection. For example, the token may be inside a terminal's input slot, or held a short distance near the terminal. Operation 402 may be performed by a component that is the same as or similar to the circuitry 106, in accordance with one or more embodiments.

In an operation 404, a state of the transaction token is determined. In some embodiments, the state is determined based on the token receiving power or communications, such as commands and data transmissions, from the terminal. By way of example, the state of the token may include (i) a first state in which the token is being read by the terminal, (ii) a second state in which the token is not being read by the terminal, or (iii) other state. In a further example, if the token is currently being read or has been read within a predetermined threshold amount of time (e.g., 10 milliseconds, 1 second, 5 seconds, etc.), it may be determined that the state of the token is that the token is being read by the terminal. In a further example, if the token has not been read within the predetermined threshold amount of time, it may be determined that the state of the token is that the token is not being read by the terminal. Operation 404 may be performed by a component that is the same as or similar to the circuitry 106, in accordance with one or more embodiments.

In an operation 406, a signal related to a detectable change is generated. In some embodiments, the signal may be generated based on the state of the token in operation 404. By example, if the token is determined to be in a first state (e.g., a state of being read by the terminal), the signal may be a first signal (e.g., a first voltage) related to a first color (e.g., red). In a further example, if the token is determined to be in a second state (e.g., a state of not being read by the terminal), the signal may be a second signal (e.g., a second voltage) related to a second color (e.g., green).

In an operation 408, based on the signal being a first signal, one or more portions of the token is caused to produce a first detectable change. For example, if the signal was a first signal of a first specified voltage in operation 406, one or more portions of the token may be caused to be a first color of red in operation 408. In some embodiments, a first color indicates that the status of the transaction is in progress and the user may not terminate usage of the token. In some embodiments, after the portions of the token is caused to produce a detectable change, the portions of the token may be caused to reverse the detectable change. For example, reversing the detectable change of a red or green color may result in a color that is colorless, white, or neutral, or no illumination. Operation 408 may be performed by a change element that is the same or similar to a change element 104, in accordance with one or more embodiments.

In an operation 410, based on the signal being a second signal, one or more portions of the token is caused to produce a second detectable change. For example, if the signal was a second signal of Y volts in operation 406, one or more portions of the token may be caused to be a second color of green in operation 410. In some embodiments, a second color indicates that the status of the transaction is complete and a user of the token during a transaction may terminate usage of the token. In some embodiments, after the portions of the token are caused to produce a second detectable change, the portions of the token may be caused to reverse the detectable change. For example, reversing the detectable change of a green color may result in a color that is colorless, white, or neutral, or no illumination. Operation 412 may be performed by a change element that is the same or similar to a change element 104, in accordance with one or more embodiments.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: generating, by a token, a signal related to a detectable change; and causing, by the token, the detectable change to one or more portions of the token based on the signal.
2. The method of embodiment 1, wherein the token comprises circuitry and a change element.
3. The method of embodiment 2, wherein the signal is generated by the circuitry of the token.
4. The method of any of embodiments 2-3, further comprising: transmitting, by the circuitry, the signal to the change element; wherein the change element causes the detectable change.
5. The method of any of embodiments 2-4, wherein the change element comprises any material that produces a detectable change in response to a signal (e.g., a tactile element comprising an electroactive polymer).
6. The method of any of embodiments 2-5, wherein the change element comprises (1) an electrochromic element that includes a metal oxide, conjugated polymer, transition metal complex, viologen, or a metal hexacyanometallate or (2) a light-emitting diode element.
7. The method of any of embodiments 1-6, wherein the signal comprises a voltage or other stimulus that causes the one or more portions of the token to produce the detectable change.
8. The method of any of embodiments 1-7, wherein the signal is associated with a specific color or illumination.
9. The method of any of embodiments 1-8, wherein the signal is (1) a first signal associated with a first color or illumination; or (2) a second signal associated with a second color or illumination.
10. The method of any of embodiments 1-9, wherein the signal is based on a state of the token.
11. The method of any of embodiments 2-10, further comprising: determining, by the circuitry, the state of the token as being: (1) a state of being read by a terminal; or (2) a state of not being read by a terminal.
12. The method of any of embodiments 2-11, further comprising: generating, by the circuitry, a change reversal signal after the detectable change is caused to the one or more portions of the token; and causing, by the token, the detectable change to be reversed in the one or more portions of the token based on the change reversal signal.
13. The method of any of embodiments 1-12, wherein the detectable change comprises any change to the one or more portions of the token that is detectable to a user of the token, such as illumination, texture, temperature, size, shape, or other property of the one or more portions of the token.
14. The method of any of embodiments 1-13, wherein the detectable change is associated with an indication of the status of the token as being "in progress" or "complete."
15. The method of any of embodiments 2-14, wherein the one or more portions of the token comprises the change element.
16. The method of any of embodiments 1-15, wherein the one or more portions of the token comprise one or more edges, shapes, or logos of the token.
17. The method of any of embodiments 1-16, wherein the token comprises a credit card, a debit card, a transit pass, an access card, a mobile device, a wearable device, a wireless device, or other user devices.
18. The method of any of embodiments 1-17, wherein the signal is generated by the transaction token during powering of the transaction token by a terminal processing a transaction associated with the transaction token, and wherein the terminal comprises a transaction terminal, an access point, or other device.
19. A tangible, non-transitory, machine-readable media storing instructions that, when executed by an apparatus, cause the apparatus to effectuate operations comprising those of any of embodiments 1-18.
20. A system comprising: one or more processors; and memory storing instructions that, when executed by the processors, cause the processors to effectuate operations comprising those of any of embodiments 1-18.
21. An apparatus (e.g., token) that performs the operations of any of embodiments 1-18.

What is claimed is:

1. A transaction card comprising:
   circuitry embedded in the transaction card; and
   an electrochromic element that is at least part of one or more edges of the transaction card;
   wherein the circuitry is configured to:
      determine a state of the transaction card while the transaction card is powered by a terminal processing a transaction associated with the transaction card;
      generate a signal related to a color based on the state of the transaction card such that the signal is:
         a first signal in response to the state being a first state corresponding to a first status of the transaction processed by the terminal;
         a second signal in response to the state being a second state corresponding to a second status of the transaction; and
      cause the signal to be transmitted to the electrochromic element;
   wherein the electrochromic element is configured such that the electrochromic element causes the one or more edges to be (i) a first color in response to the signal being the first signal and (ii) a second color different from the first color in response to the signal being the second signal.

2. The transaction card of claim 1, wherein the transaction card comprises a credit card, a debit card, a travel pass, or a payment card.

3. The transaction card of claim 1, wherein the electrochromic element is configured such that the electrochromic element causes the one or more edges to be (i) the first color in response to the signal being the first signal, (ii) the second color in response to the signal being the second signal, and (iii) a third color different from the first and second colors in response to the signal being a third signal.

4. The transaction card of claim 1, wherein the electrochromic element comprises a metal oxide, conjugated polymer, transition metal complex, viologen, or a metal hexacyanometallate.

5. A method comprising:
   generating, by circuitry embedded in a transaction card, a signal related to an illumination or color based on a state of the transaction card, the signal being generated during powering of the transaction card such that the signal is:
      (i) a first signal in response to the state being a first state corresponding to a first status of a transaction processed by a terminal;
      (ii) a second signal in response to the state being a second state corresponding to a second status of the transaction; and providing, by the circuitry, the signal to a light emitting element such that the light emitting element becomes (i) a first illumination or color in response to the signal being the first signal and (ii) a second illumination or color in response to the signal being the second signal.

6. The method of claim 5, wherein the transaction card comprises a credit card, a debit card, a travel pass, or a payment card.

7. The method of claim 5, further comprising:
determining, by the circuitry, the state of the transaction card, the state of the transaction card being determined during the powering of the transaction card,
wherein generating the signal comprises generating, by the circuitry, the signal based on the state of the transaction card.

8. The method of claim 5, wherein the light emitting element becomes a third illumination or color in response to the signal being a third signal.

9. The method of claim 5, wherein the light emitting element becomes (i) a first color in response to the signal being the first signal and (ii) a second color in response to the signal being the second signal.

10. The method of claim 5, wherein the light emitting element becomes (i) a first illumination in response to the signal being the first signal and (ii) a second illumination in response to the signal being the second signal.

11. The method of claim 5, wherein the light emitting element comprises one or more edges of the transaction card, and wherein the one or more edges becomes (i) the first illumination or color in response to the signal being the first signal and (ii) the second illumination or color in response to the signal being the second signal.

12. The method of claim 5, wherein the light emitting element comprises a logo, and wherein the light emitting element causes the logo to be (i) the first illumination or color in response to the signal being the first signal and (ii) the second illumination or color in response to the signal being the second signal.

13. The method of claim 5, wherein the light emitting element comprises an electrochromic element, and wherein the electrochromic element comprises a metal oxide, conjugated polymer, transition metal complex, viologen, or a metal hexacyanometallate.

14. One or more computer-readable media storing instructions that, when executed by one or more processors of a transaction card, cause operations comprising:
generating a signal related to an illumination or color based on a state of the transaction card, the signal being generated during powering of the transaction card such that the signal is:
(i) a first signal in response to the state being a first state corresponding to a first status of a transaction processed by a terminal;
(ii) a second signal in response to the state being a second state corresponding to a second status of the transaction; and
providing the signal to a light emitting element such that the light emitting element becomes (i) a first illumination or color in response to the signal being the first signal and (ii) a second illumination or color in response to the signal being the second signal.

15. The media of claim 14, wherein the transaction card comprises a credit card, a debit card, a travel pass, or a payment card.

16. The media of claim 14, the operations further comprising:
determining the state of the transaction card, the state of the transaction card being determined during the powering of the transaction card,
wherein generating the signal comprises generating the signal based on the state of the transaction card.

17. The media of claim 14, wherein the light emitting element becomes a third illumination or color in response to the signal being a third signal.

18. The media of claim 14, wherein the light emitting element becomes (i) a first color in response to the signal being the first signal and (ii) a second color in response to the signal being the second signal.

19. The media of claim 14, wherein the light emitting element becomes (i) a first illumination in response to the signal being the first signal and (ii) a second illumination in response to the signal being the second signal.

20. The media of claim 14, wherein the light emitting element comprises an electrochromic element, and wherein the electrochromic element comprises one or more edges of the transaction card, wherein the one or more edges becomes (i) the first illumination or color in response to the signal being the first signal and (ii) the second illumination or color in response to the signal being the second signal.

* * * * *